(12) United States Patent
Wakasugi et al.

(10) Patent No.: US 12,076,856 B2
(45) Date of Patent: Sep. 3, 2024

(54) ARM-TYPE ASSISTANCE DEVICE

(71) Applicant: CKD CORPORATION, Komaki (JP)

(72) Inventors: Satoshi Wakasugi, Komaki (JP); Shigetaka Matsumoto, Komaki (JP)

(73) Assignee: CKD CORPORATION, Aichi (JP)

( * ) Notice: Subject to any disclaimer, the term of this patent is extended or adjusted under 35 U.S.C. 154(b) by 332 days.

(21) Appl. No.: 17/767,042

(22) PCT Filed: Aug. 20, 2020

(86) PCT No.: PCT/JP2020/031464
§ 371 (c)(1),
(2) Date: Apr. 6, 2022

(87) PCT Pub. No.: WO2021/070484
PCT Pub. Date: Apr. 15, 2021

(65) Prior Publication Data
US 2022/0388153 A1 Dec. 8, 2022

(30) Foreign Application Priority Data
Oct. 11, 2019 (JP) ................................. 2019-187912

(51) Int. Cl.
*B25J 9/00* (2006.01)
*B25J 9/14* (2006.01)
*B25J 9/16* (2006.01)

(52) U.S. Cl.
CPC ............ *B25J 9/0009* (2013.01); *B25J 9/14* (2013.01); *B25J 9/1674* (2013.01); *B25J 9/1694* (2013.01)

(58) Field of Classification Search
CPC . B25J 9/0009; B25J 9/14; B25J 9/1674; B25J 9/1694; B66C 13/04; B66C 23/04; B66C 23/14; B66F 19/00; B66F 13/00
See application file for complete search history.

(56) References Cited

U.S. PATENT DOCUMENTS

2007/0115309 A1* 5/2007 Miura ................. B41J 2/17596
347/9
2016/0152122 A1* 6/2016 Arichandran ...... B62D 33/0617
160/59
(Continued)

FOREIGN PATENT DOCUMENTS

DE 29707422 U1 6/1997
JP H04-69175 A 3/1992
(Continued)

OTHER PUBLICATIONS

Extended European Search Report (EESR) for corresponding EP Application No. 20873528.2, dated Nov. 13, 2023, pp. 1-9.
(Continued)

*Primary Examiner* — Kira Nguyen
(74) *Attorney, Agent, or Firm* — Tarolli, Sundheim, Covell & Tummino LLP

(57) ABSTRACT

An arm-type assistance device includes a pillar, a first support portion, a first arm, a second support portion, a second arm, a third arm, an operating unit, and a cargo holding unit. The first arm includes a first member, a first air cylinder, and a second member. The first support portion, the first member, the second support portion, and the second member form a parallel linkage. The parallel linkage is assisted by the first air cylinder. The arm-type assistance device further includes a controller that is configured to control pressure of first air cylinder. The third arm includes a second air cylinder. The controller controls pressure of the second air cylinder. A dimension in an axial direction of the second arm is greater than a dimension in an axial direction of the first arm.

9 Claims, 10 Drawing Sheets

(56) References Cited

U.S. PATENT DOCUMENTS

| | | | | |
|---|---|---|---|---|
| 2017/0275798 A1* | 9/2017 | Harada | .................... | B65H 3/26 |
| 2018/0265192 A1* | 9/2018 | Yamagami | ............. | B64U 10/13 |
| 2018/0281174 A1* | 10/2018 | Watanabe | ................ | B25J 9/046 |
| 2021/0138637 A1* | 5/2021 | Wakasugi | .............. | B25J 9/1065 |

FOREIGN PATENT DOCUMENTS

| | | |
|---|---|---|
| JP | H0632500 A | 2/1994 |
| JP | H06-32500 U | 4/1994 |
| JP | 11-147698 A | 6/1999 |
| JP | 5073923 B2 | 11/2012 |
| JP | 2019-048364 A | 3/2019 |

OTHER PUBLICATIONS

CD-ROM of the specification and drawings annexed to the request of Japanese Utility Model Application No. 034339/1992 (Laid-open No. 032500/1994) (Towa Mekkusu KK) Apr. 28, 1994, paragraph [0008], fig. 1, 3.

Microfilm of the specification and drawings annexed to the request of Japanese Utility Model Application No. 036407/1990 (Laid-open No. 127700/1991) (Kubota Corp.) Dec. 24, 1991.

International Search Report and Written Opinion issued in connection with corresponding PCT Application No. PCT/JP2020/031464 dated Oct. 1, 2020.

* cited by examiner

ARM-TYPE ASSISTANCE DEVICE

RELATED APPLICATIONS

The present invention is a U.S. National Stage under 35 USC 371 patent application, claiming priority to Serial No. PCT/JP2020/031464, filed on Aug. 20, 2020; which claims priority from Japanese Patent Application No. 2019-187912 filed on Oct. 11, 2019; the entireties of both are hereby incorporated herein by reference.

TECHNICAL FIELD

The present disclosure relates to an arm-type assistance device.

BACKGROUND ART

When moving a carried object such as a relatively heavy component or cargo, the use of an arm-type assistance device reduces the load on an operator. Patent Literature 1 discloses a cargo handling machine as an example of an arm-type assistance device. The cargo handling machine includes a pillar extending vertically and a control box at an upper portion of the pillar. The control box incorporates a pneumatic cylinder. The pneumatic cylinder is connected to an air supply via an air control system.

The cargo handling machine includes a lift mechanism having first to third arms. The first arm is pivotal in a vertical direction within a predetermined angle range and is driven by the pneumatic cylinder. Also, the first arm is supported by the pillar to be rotated in the horizontal direction about a central axis of the pillar. The second arm is coupled to the distal end portion of the first arm at a joint so as to be always maintained in a horizontal state. The third arm, which extends vertically, is coupled to the distal end portion of the second arm so as to be rotatable in the horizontal direction. For example, a suction mechanism is attached to the lower end portion of the third arm. The suction mechanism is an operating unit that holds a carried object through air suction.

When the suction mechanism performs suction to lift a carried object, the entirety of the first to third arms receives a downward force corresponding to the sum of the weight of the carried object and the weight of the first to third arms. The internal pressure of the pneumatic cylinder is increased to counteract the downward force to achieve a balanced state in which the carried object stays hoisted.

CITATION LIST

Patent Literature

Patent Literature 1: Japanese Patent No. 5073923

SUMMARY OF THE INVENTION

Technical Problem

With the cargo handling machine of Patent Literature 1, the movement range of the suction mechanism in the horizontal direction or the vertical direction can be extended by increasing the dimensions in the axial direction of the first to third arms. However, extended dimensions of the first to third arms increase the weight of the first to third arms, which increases the above-described downward force. Accordingly, the size of the pneumatic cylinder is increased in order to balance with the increased downward force. As the size of the pneumatic cylinder increases, the sliding resistance of the piston in the cylinder tube is increased. This may reduce the operability.

It is an objective of the present disclosure to provide an arm-type assistance device that is capable of extending a movement range of an operating unit without reducing operability.

Solution to Problem

In one general aspect, an arm-type assistance device is provided that includes a pillar, a first support portion, a first arm, a second support portion, a second arm, a third arm, an operating unit, and a cargo holding unit. The pillar includes an axis extending in a vertical direction. The first support portion is supported by an upper end of the pillar so as to be rotatable in a horizontal direction. The first arm includes a proximal end portion. The proximal end portion is supported by the first support portion so as to be swingable in the vertical direction. The second support portion is supported by a distal end portion of the first arm so as to be swingable in the vertical direction. The second arm includes a proximal end portion. The proximal end portion is supported by an upper end of the second support portion so as to be rotatable in the horizontal direction. The third arm extends downward in the vertical direction from a distal end portion of the second arm. The operating unit is supported by a lower end of the third arm so as to be rotatable in the horizontal direction. The cargo holding unit is integrated with the operating unit. The first arm includes a first member, a first air cylinder, and a second member. The first member includes a first end portion and a second end portion. The first end portion is supported by the first support portion so as to be swingable in the vertical direction. The second end portion is supported by the second support portion so as to be swingable in the vertical direction. The first air cylinder is configured to swing the first member relative to the first support portion. The second member extends parallel with the first member and includes a first end portion and a second end portion. The first end portion is supported by the first support portion so as to be swingable in the vertical direction. The second end portion is supported by the second support portion so as to be swingable in the vertical direction. The first support portion, the first member, the second support portion, and the second member form a parallel linkage. The parallel linkage is assisted by operation of the first air cylinder. The arm-type assistance device further includes a controller that is configured to control pressure of the first air cylinder. The third arm includes a second air cylinder. A pressure of the second air cylinder is controlled by the controller. The second air cylinder includes a piston rod that includes a protruding end, the protruding end supporting the operating unit. A dimension in an axial direction of the second arm is greater than a dimension in an axial direction of the first arm.

DESCRIPTION OF EMBODIMENTS

An arm-type assistance device according to one embodiment will now be described with reference to FIGS. 1 to 10.

Figure 1:
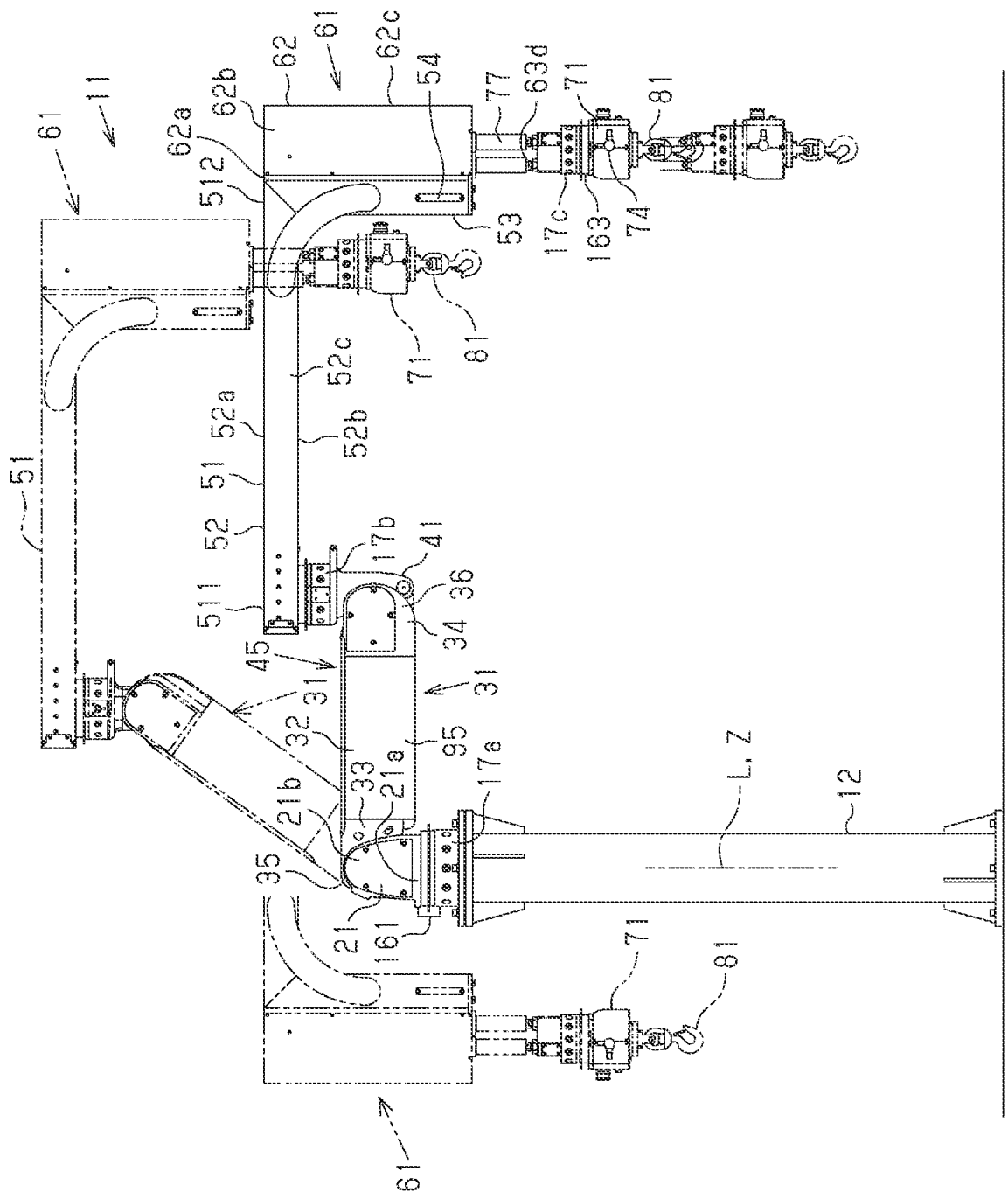
FIG. 1 is a side view illustrating an arm-type assistance device according to one embodiment.

As shown in FIG. 1, an arm-type assistance device 11 includes a pillar 12, a first support portion 21, which is supported by the pillar 12, a first arm 31, which is supported by the first support portion 21, a second support portion 41, which is supported by the first arm 31, a second arm 51, which is supported by the second support portion 41, and a third arm 61, which is coupled to the second arm 51. The arm-type assistance device 11 includes an operating unit 71 and a cargo holding unit 81, which are supported by the third arm 61. In the present embodiment, the cargo holding unit 81 includes a hook type sling tool. The cargo holding unit 81 may include a tool other than a hook type sling tool. For example, the cargo holding unit 81 may include a tool that supports a carried object through suction, or a robot hand that holds a carried object. The arm-type assistance device 11 includes an actuator 90, which swings the first arm 31 relative to the first support portion 21, thereby moving the second support portion 41.

Figure 8:
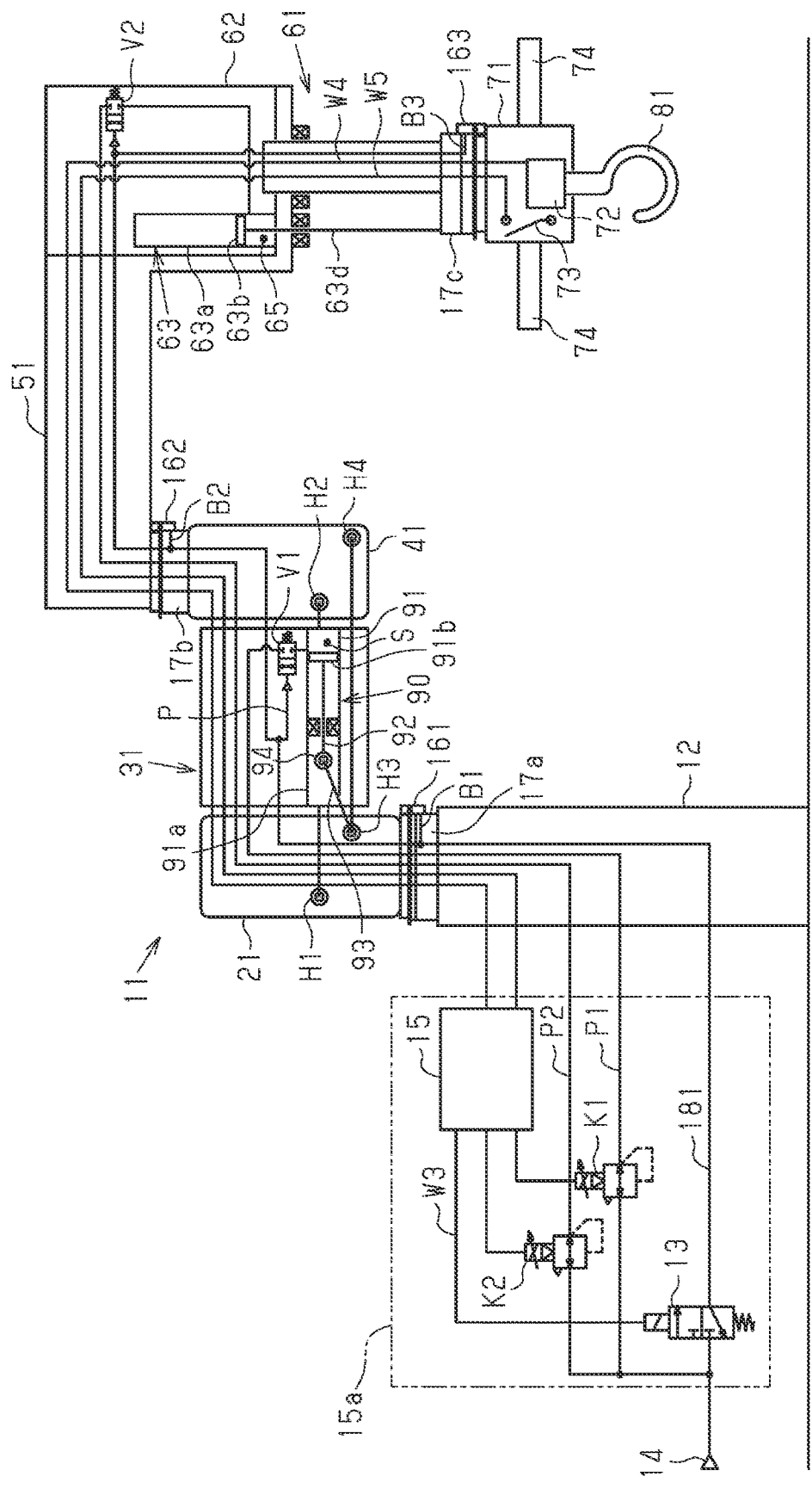
FIG. 8 is a circuit diagram of the arm-type assistance device shown in FIG. 1.

As shown in FIG. 8, the operating unit 71 incorporates a load sensor 72. The load sensor 72 detects a load that includes a carried object slung from the cargo holding unit 81. The load sensor 72 outputs a signal related to a detected value to a controller 15, which controls operation of the arm-type assistance device 11. The operating unit 71 incorporates a detection switch 73. The detection switch 73 is connected to the controller 15 so as to allow for transmission of signals. The detection switch 73 is turned on when detecting that the operating unit 71 is operated and outputs an ON signal to the controller 15.

Compressed air is used to drive the arm-type assistance device 11. The arm-type assistance device 11 is supplied with compressed air from an air supply source 14. In the following description, compressed air is simply referred to as air. The arm-type assistance device 11 includes the controller 15, which controls pneumatic devices, which will be discussed below, and regulates the pressure of air. The controller 15 calculates the pressure of air to be supplied to the arm-type assistance device 11 such that the pressure balances the weight of the carried object slung from the arm-type assistance device 11. The controller 15 is accommodated in an accommodation case 15a.

Figure 5A:
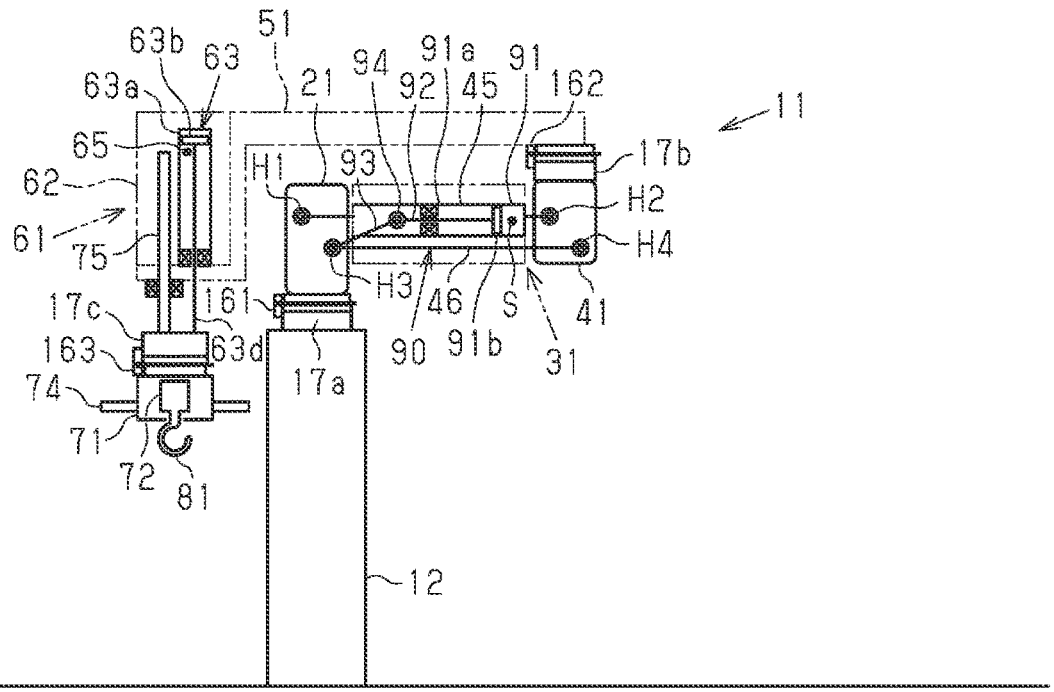
FIG. 5A is a diagram schematically showing the structure of the arm-type assistance device in an initial state.

The state of the arm-type assistance device 11 shown in FIG. 5A will hereafter be referred to as an initial state. In the initial state of the arm-type assistance device 11, the first arm 31 and the second arm 51 are both substantially in a horizontal position, and the second arm 51 is folded back toward the pillar 12 such that the first arm 31 and the second arm 51 overlap with each other in the vertical direction. In the initial state of the arm-type assistance device 11, the third arm 61 is adjacent to and overlaps with the pillar 12 in the horizontal direction. In the initial state of the arm-type assistance device 11, the operating unit 71 is located at a position closest to the third arm 61.

Figure 2:
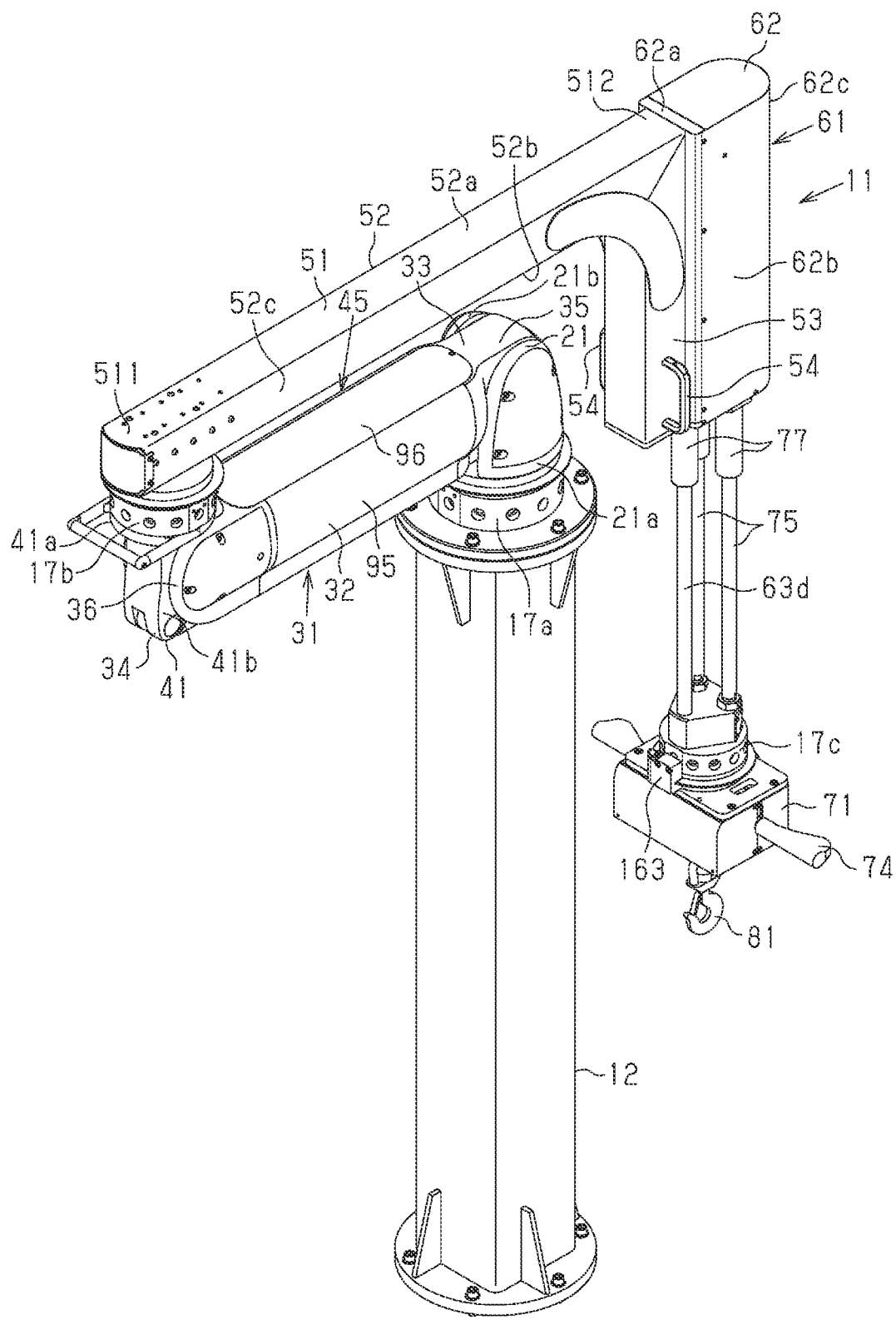
FIG. 2 is a perspective view of the arm-type assistance device shown in FIG. 1.
Figure 3:
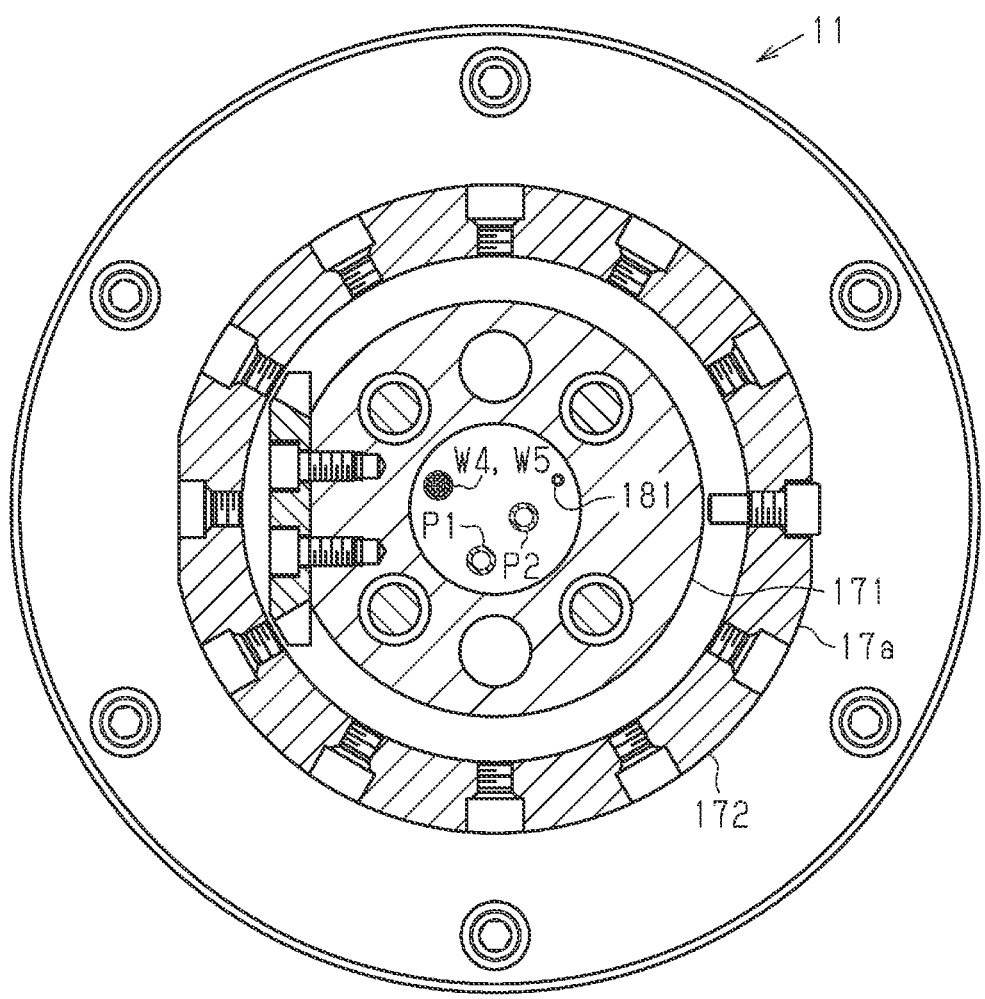
FIG. 3 is a cross-sectional view showing a rotational joint in the arm-type assistance device shown in FIG. 1.

As shown in FIG. 2, a first rotational joint 17a is provided at the upper end of the pillar 12. A first lock mechanism 161, which restricts rotation of the first support portion 21, is provided on the first rotational joint 17a. As shown in FIG. 3, the first rotational joint 17a includes an inner cylinder 171 and an outer cylinder 172, which is arranged about the outer circumferential surface of the inner cylinder 171 with a clearance in between.

As shown in FIG. 8, an operation air pipe 181, which is connected to the air supply source 14, a first air pipe P1, a second air pipe P2, and wires, which are connected to the controller 15 pass through the inner cylinder 171. The wires will be discussed below. The operation air pipe 181 is configured to supply operation air used to operate a first on-off valve V1, a second on-off valve V2, first to third lock mechanisms 161 to 163, which will be discussed below. The first air pipe P1 is configured to supply balancing pressure to the first arm 31, and the second air pipe P2 is configured to supply balancing pressure to the third arm 61.

The operation air pipe 181 is provided with a three-port valve 13, which is one of the pneumatic devices. The three-port valve 13 is switched between a position in which the three-port valve 13 supplies air supplied by the air supply source 14 to the arm-type assistance device 11, and a position in which the three-port valve 13 discharges air from the arm-type assistance device 11. The three-port valve 13 is connected to the controller 15 by a wire W3 so as to allow for transmission of signals. The three-port valve 13 is accommodated in the accommodation case 15a.

The first lock mechanism 161 is put into a locked state when a rotating lock disc is held by a lock pad, and is put into an unlocked state when the rotating lock disc is released by the lock pad. The operation air pipe 181, the first air pipe P1, the second air pipe P2, and wires connected to the controller 15 pass through the first lock mechanism 161. The wires will be discussed below. The first lock mechanism 161 is connected to a first locking air pipe B1, which branches from the operation air pipe 181. The air supply source 14 supplies air to the first lock mechanism 161 through the operation air pipe 181 and the first locking air pipe B1. When the pressure of the supplied air is greater than or equal to a predetermined pressure, the lock pad separates from the rotating lock disc, so that the first lock mechanism 161 is put into the unlocked state. When the pressure of the air supplied to the first lock mechanism 161 is less than the predetermined pressure, the lock pad is urged toward the rotation locking disc by an urging member (not shown). Accordingly, the lock pad holds the rotating lock disc, so that the first lock mechanism 161 is put into the locked state. Therefore, the first lock mechanism 161 is controlled by the air supplied from the operation air pipe 181 through the first locking air pipe B1.

The first support portion 21 will now be described.

As shown in FIGS. 1 and 2, the first support portion 21 is fixed to an upper part of the first lock mechanism 161. The first support portion 21 is supported by the first rotational joint 17a with the first lock mechanism 161 in between. Accordingly, the first support portion 21 is supported on the upper end face of the pillar 12 to be rotational in the horizontal direction. The first support portion 21 rotates about a first vertical axis Z, which extends along an axis L of the pillar 12. The rotation range of the first support portion 21 is less than 360 degrees, and is, for example, 300 degrees in the present embodiment.

Figure 4:
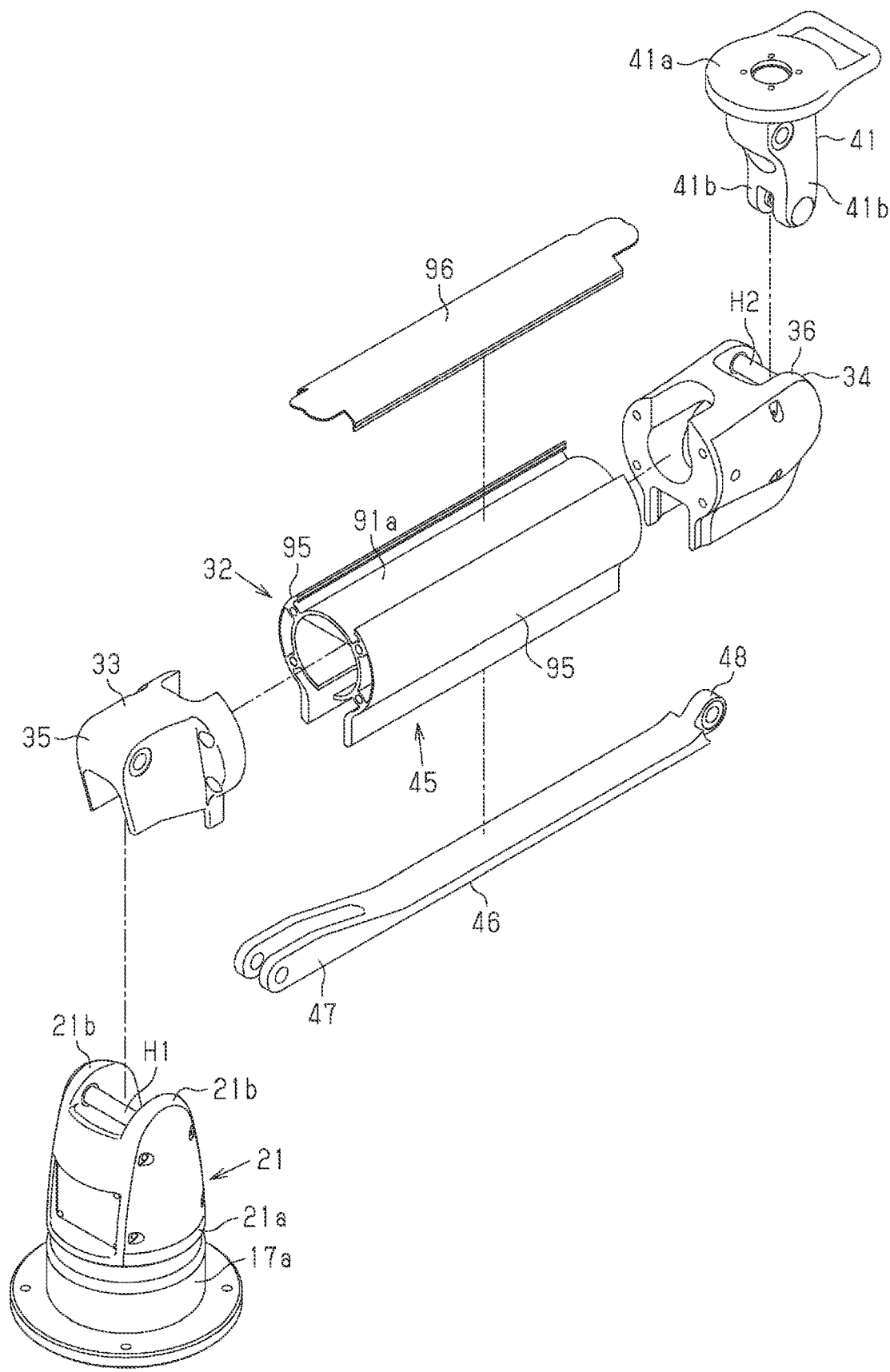
FIG. 4 is an exploded perspective view showing a first arm in the arm-type assistance device shown in FIG. 1.

As shown in FIG. 4, the first support portion 21 includes a disc-shaped base plate 21a at the lower end portion and two first pivot supports 21b, which extend upward from the base plate 21a. The two first pivot supports 21b face each other with a space in between.

The second support portion 41, which makes a pair with the first support portion 21, includes a disc-shaped support plate 41a at the upper end portion and plate-shaped second pivot supports 41b, which extend vertically downward from the support plate 41a.

As shown in FIGS. 4 and 5A, the first arm 31 includes a hollow arm body 32, a first pivot member 33, which is coupled to a first end in the axial direction of the arm body 32, a second pivot member 34, which is coupled to a second end in the axial direction of the arm body 32, and a second member 46. The arm body 32 is made of extruded aluminum.

The first arm 31 includes a plate-shaped proximal end portion 35 at a first end in the axial direction and a bifurcated distal end portion 36 at a second end in the axial direction. The proximal end portion 35 includes the first pivot member 33. The distal end portion 36 includes the second pivot member 34.

The proximal end portion 35 of the first arm 31 is arranged between the two first pivot supports 21b of the first support portion 21. A first horizontal shaft H1 is passed through the first pivot supports 21b and the first pivot member 33. The first horizontal shaft H1, which is supported by the first support portion 21, supports the proximal end portion 35 of the first arm 31 such that the proximal end portion 35 is swingable in the vertical direction relative to the first support portion 21.

Also, the second pivot supports 41b of the second support portion 41 are arranged between the bifurcated sections of the distal end portion 36 of the first arm 31. A second horizontal shaft H2 is passed through the second pivot supports 41b and the second pivot member 34. The second horizontal shaft H2 supports the second support portion 41 such that the second support portion 41 is swingable in the vertical direction relative to the distal end portion 36 of the first arm 31.

The arm body 32 of the first arm 31 is mainly formed by a cylinder tube 91a of a first air cylinder 91. Two first cover members 95, which face each other in a radial direction of the cylinder tube 91a, are fixed to the outer surface of the cylinder tube 91a. A second cover member 96 is fixed to the upper ends of the two first cover members 95. The second member 46 is arranged at the lower end of the two first cover members 95. The cylinder tube 91a, the two first cover members 95, and the second cover member 96 form the arm body 32.

The first pivot member 33 is fixed to a first end portion of the cylinder tube 91a, which is a first end portion in the axial direction of the arm body 32. The second pivot member 34 is fixed to a second end portion of the cylinder tube 91a, which is a second end portion in the axial direction of the arm body 32. The arm body 32, the first pivot member 33, and the second pivot member 34 form a first member 45.

The first pivot member 33 forms a first end portion of the first member 45, which is supported by the first support portion 21 so as to be swingable in the vertical direction. The second pivot member 34 forms a second end portion of the first member 45, which is supported by the second support portion 41 so as to be swingable in the vertical direction.

The axis of the second member 46 extends in parallel with the axis of the first member 45. The second member 46 has the shape of a rectangular bar. A first end portion 47 of the second member 46 is supported by the first support portion 21 with a third horizontal shaft H3 so as to be swingable in the vertical direction. A second end portion 48 of the second member 46 is supported by the second support portion 41 with a fourth horizontal shaft H4 so as to be swingable in the vertical direction.

The first arm 31 incorporates the actuator 90. The actuator 90 includes the first air cylinder 91, an actuation rod 92 of the first air cylinder 91, and a link member 93. The actuation rod 92 of the first air cylinder 91 moves in the axial direction of the first arm 31. The link member 93 includes a proximal end portion, which is supported by the first support portion 21 so as to swing. The link member 93 is inclined relative to the actuation rod 92. The actuator 90 includes a coupling body 94, which is coupled to the actuation rod 92. The distal end portion of the link member 93 is pivotally coupled to the coupling body 94.

The cylinder tube 91a of the arm body 32 accommodates a movable piston 91b. The piston 91b defines a piston chamber S in the cylinder tube 91a. A seal member (not shown) is attached to the outer circumferential surface of the piston 91b. One end of the actuation rod 92 is coupled to the piston 91b. The piston 91b moves in the axial direction of the first arm 31 as the actuation rod 92 moves.

Figure 5B:
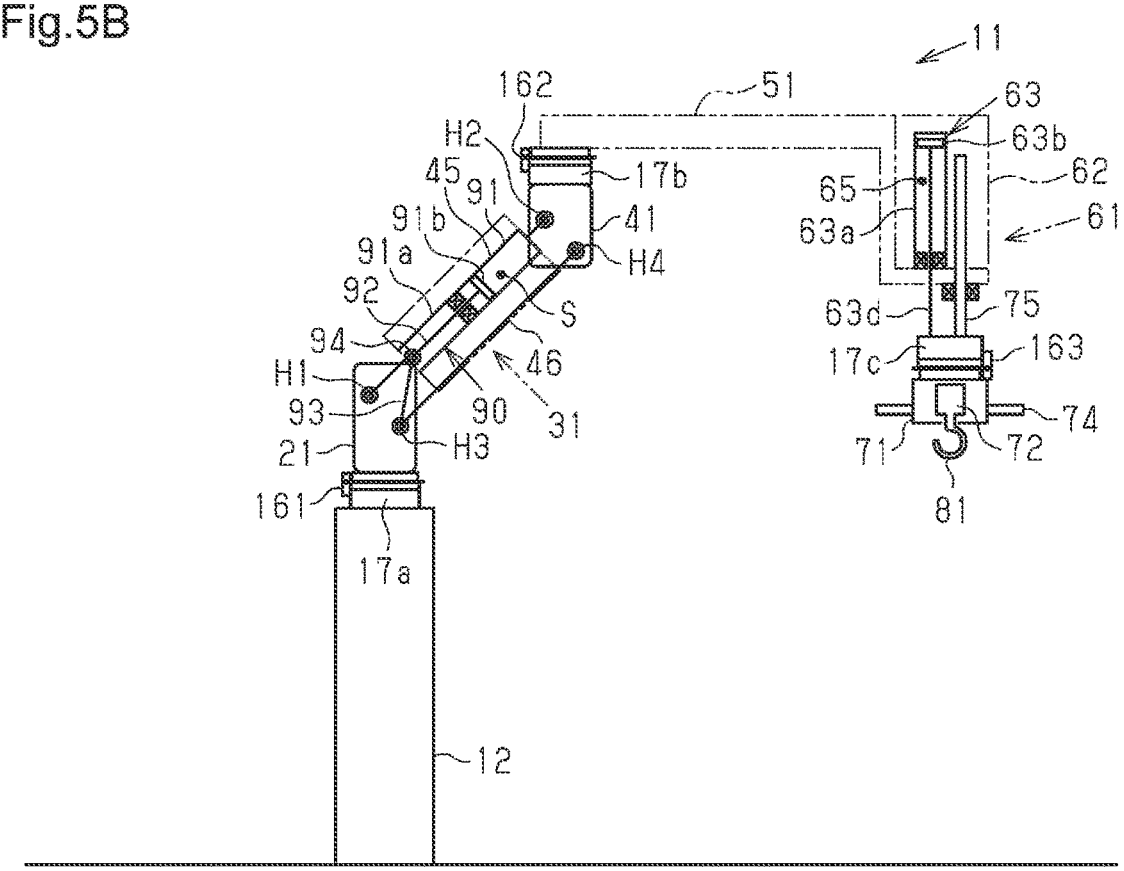
FIG. 5B is a diagram schematically showing the structure of the arm-type assistance device in an operational position.

The first support portion 21, the first member 45, the second support portion 41, and the second member 46 form a parallel linkage that forms a parallelogram. When the first member 45 and the second member 46 swing vertically in relation to the first support portion 21 as the actuation rod 92 of the first air cylinder 91 moves as shown in FIG. 5B, the second support portion 41 is translated in the vertical direction. The first member 45 and the second member 46 respectively correspond to the long sides of the parallelogram, and the first support portion 21 and the second support portion 41 correspond to the short sides of the parallelogram.

As shown in FIG. 8, the piston chamber S of the first air cylinder 91 is connected to the first on-off valve V1. The first on-off valve V1 connects the first air pipe P1 and the piston chamber S to each other or disconnects the first air pipe P1 and the piston chamber S from each other. That is, the first on-off valve V1 switches the state of the piston chamber S between a state in which the pressure in the piston chamber S is controlled constantly and a state in which inflow and outflow of air to and from the piston chamber S are blocked in order to maintain the pressure in the piston chamber S.

An operating branch air pipe P is used to operate the first on-off valve V1 and is connected to an operating port of the first on-off valve V1. The operating port of the first on-off valve V1 is supplied with pilot air from the operation air pipe 181 through the operating branch air pipe P. Thus, the operation air pipe 181 is configured to supply operation air for operating the first on-off valve V1. The pressure in the operation air pipe 181 is turned on or off by opening or closing the three-port valve 13. The first air pipe P1 is connected to a first electro-pneumatic regulator K1. The first electro-pneumatic regulator K1 is one of the pneumatic devices. The first electro-pneumatic regulator K1 is accommodated in the accommodation case 15a.

The operation air pipe 181 is routed into the first arm 31 from the air supply source 14 via the pillar 12, the interior of the first lock mechanism 161, the interior of the first rotational joint 17a, and the interior of the first support portion 21. The operating branch air pipe P, which branches off the operation air pipe 181, is routed into the first arm 31.

The controller 15 calculates the balancing pressure based on a value detected by the load sensor 72. The balancing pressure is a pressure that is balanced with the weight supported by the first arm 31, that is, the total weight of a section from the second support portion 41 to the cargo holding unit 81 and the carried object. The first electro-pneumatic regulator K1 is controlled constantly so as to always supply the balancing pressure of the first air cylinder 91, which is applied to the parallel linkage of the first arm 31. When the three-port valve 13 supplies air to the operation air pipe 181 from the air supply source 14, and air is supplied from the operating branch air pipe P to the operating port of the first on-off valve V1, the first on-off valve V1 is put into the open state. The controller 15 controls the first electro-pneumatic regulator K1 such that the calculated balancing pressure is supplied to the piston chamber S. This is also referred to as a controlled state of the balancing pressure.

When the three-port valve 13 discharges air from the operation air pipe 181, air is also discharged from the operating branch air pipe P. This shuts off the first on-off valve V1 and blocks inflow and outflow of air.

When the operating unit 71 is in an operation state, the three-port valve 13 puts the first on-off valve V1 into the open state, so that the balancing pressure, which balances the load, is supplied to the first air cylinder 91. This puts the load in a balanced state and maintains the balanced state.

When the operating unit 71 is manually moved vertically, the volume of the piston chamber S of the first air cylinder 91 changes. In this case, the controller 15 calculates the balancing pressure based on the value detected by the load sensor 72. The first electro-pneumatic regulator K1 supplies the balancing pressure to the piston chamber S of the first air cylinder 91, so as to put the force transmitted through the parallel linkage of the first arm 31 into a balanced state. This controls the balancing pressure of the arm-type assistance device 11 and maintains the balanced state, allowing an operator to operate the operating unit 71 with a relatively small force.

In a non-operation state of the operating unit 71, the control for keeping the load in balance is performed constantly, and the three-port valve 13 puts the first on-off valve V1 into the closed state. This blocks inflow of air to and discharge of air from the piston chamber S, so that movement in the vertical direction of the arm-type assistance device 11 is restricted. That is, since the first on-off valve V1 is put into the closed state, the pressure in the piston chamber S cannot be controlled. Thus, the pressure in the piston chamber S acts against movement of the operating unit 71 and attempts to maintain the position of the operating unit 71.

As shown in FIG. 2, the support plate 41a of the second support portion 41 is coupled to a second rotational joint 17b, which has the same configuration as the first rotational joint 17a. The second rotational joint 17b is integrated with a second lock mechanism 162, which has the same configuration as the first lock mechanism 161. The operation air pipe 181 is routed into the second arm 51 from the first arm 31 via the interior of the second support portion 41, the interior of the second rotational joint 17b, and the interior of the second lock mechanism 162. A second locking air pipe B2, which branches from the operation air pipe 181, is connected to the second lock mechanism 162.

When air is supplied to the second lock mechanism 162 from the air supply source 14 through the operation air pipe 181 and the second locking air pipe B2, the lock pad separates from the rotating lock disc, so that the second lock mechanism 162 is put into the unlocked state. When the supply of air from the air supply source 14 is stopped, the lock pad is urged toward the rotation locking disc by the urging member (not shown). Accordingly, the lock pad holds the rotating lock disc, so that the second lock mechanism 162 is put into the locked state. Therefore, the second lock mechanism 162 is controlled by the air supplied from the operation air pipe 181 through the second locking air pipe B2.

The second rotational joint 17b is rotational in the horizontal direction on the second support portion 41. The second arm 51 is integrated with an upper part of the second lock mechanism 162, which is integrated with the second rotational joint 17b. Thus, the second arm 51 is configured to rotate in the horizontal direction. When in the locked state, the second lock mechanism 162 restricts rotation of the second arm 51. The rotation range of the second support portion 41, which is integrated with the second rotational joint 17b, is less than 360 degrees, and is, for example, 300 degrees in the present embodiment.

The second arm 51 has an L-shape and includes a first hollow body 52, which has a rectangular cross-sectional shape, and a second hollow body 53, which is coupled to the first hollow body 52. The dimension in the axial direction of the second arm 51 is greater than the dimension in the axial direction of the first arm 31. Specifically, the dimension in the axial direction of the first hollow body 52 in the second arm 51 is greater than the dimension in the axial direction of the first arm 31. The first hollow body 52 includes a rectangular plate-shaped upper wall 52a, a lower wall 52b, and two side walls 52c, which connect the upper wall 52a and the lower wall 52b to each other in the vertical direction.

The lower wall 52b of the first hollow body 52 is fixed to the second lock mechanism 162 at a proximal end portion 511 of the second arm 51. A distal end portion of the upper wall 52a forms an upper end of the second hollow body 53. That is, an upper surface of the distal end portion of the upper wall 52a is also an upper surface of the second hollow body 53. Handles 54 are respectively provided on side walls on opposite sides of the second hollow body 53.

Figure 6:
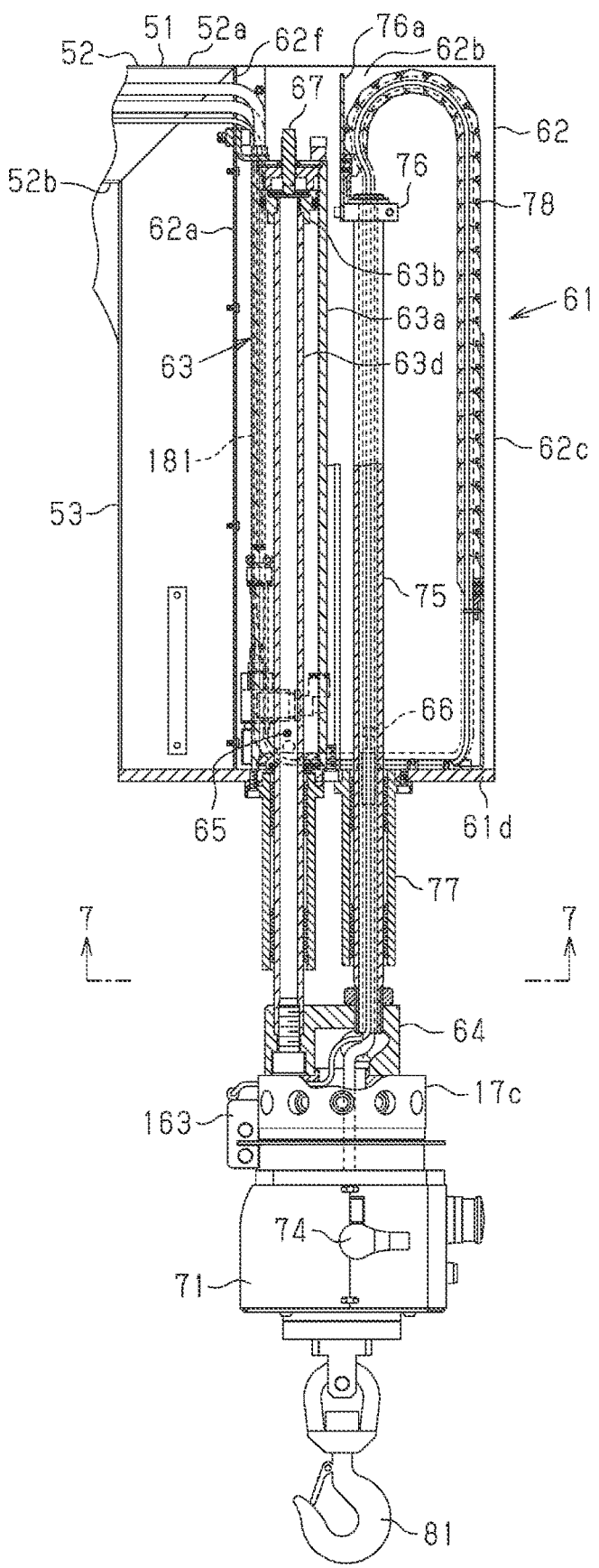
FIG. 6 is a cross-sectional side view showing a third arm in the arm-type assistance device shown in FIG. 1.

As shown in FIG. 6, the third arm 61 is fixed to outer side surfaces of a distal end portion 512 of the second arm 51, in other words, to outer side surfaces of the second hollow body 53. The third arm 61 extends from the upper end to the lower end of the second arm 51. The third arm 61 includes a hollow arm body 62, a second air cylinder 63, which is incorporated in the arm body 62, and two guide rods 75. The second air cylinder 63 is used as an actuator. The operation air pipe 181 and the second air pipe P2, which are routed into the second arm 51, pass through the second arm 51 and are routed into the third arm 61.

The axis of the arm body 62 extends in the vertical direction. The arm body 62 includes a rectangular plate-shaped joint wall 62a, which is fixed to an outer side surface of the second hollow body 53, two vertical walls 62b, which extend from the joint wall 62a, a curved wall 62c, which connects the vertical walls 62b to each other, and a closing wall 61d, which closes the lower end of the arm body 62. The two vertical walls 62b are connected to side edges of the joint wall 62a, which extend vertically. The curved wall 62c connects the side edges of the two vertical walls 62b to each other. As viewed from above in the vertical direction, the curved wall 62c arcuately bulges away from the joint wall 62a.

The joint wall 62a has a connecting hole 62f in an upper part. The connecting hole 62f is connected to the first hollow body 52 of the second arm 51. The operation air pipe 181 and the second air pipe P2, which are routed into the second arm 51, are routed into the arm body 62 of the third arm 61 through the connecting hole 62f.

The second air cylinder 63 includes a cylinder tube 63a, which is fixed to an inner surface of the arm body 62, specifically, to the inner surface of the joint wall 62a. The second air cylinder 63 is fixed to the joint wall 62a such that the axis of the cylinder tube 63a extends in the vertical direction. The cylinder tube 63a of the second air cylinder 63 has a diameter smaller than that of the cylinder tube 91a of the first air cylinder 91. The cylinder tube 63a incorporates a piston 63b. A seal member (not shown) is attached to the outer circumferential surface of the piston 63b. The cylinder tube 63a includes a piston chamber 65, which is defined below the piston 63b. A seal member is provided on the outer circumferential surface of the piston 63b to prevent air leakage from the piston chamber 65.

The piston 63b is coupled to an end of a piston rod 63d in the second air cylinder 63. The piston rod 63d extends through the lower end of the cylinder tube 63a and the closing wall 61d, and protrudes from the lower end of the arm body 62.

An impact reducing member 67 is provided on the upper end wall of the cylinder tube 63a. The impact reducing member 67 is a shock absorber. The impact reducing member 67 contacts the piston 63b when the piston 63b moves up to an end of the movement range, thereby absorbing the shock generated when the piston 63b reaches the end of the movement range.

As shown in FIG. 8, the piston chamber 65 is connected to the second on-off valve V2. The second on-off valve V2 connects the second air pipe P2 and the piston chamber 65 to each other or disconnects the second air pipe P2 and the piston chamber 65 from each other. That is, the second on-off valve V2 switches the state of the piston chamber 65 between a state in which the pressure in the piston chamber 65 is controlled constantly and a state in which inflow and outflow of air to and from the piston chamber 65 are blocked in order to maintain the pressure in the piston chamber 65.

The operation air pipe 181 is used to operate the second on-off valve V2 and is connected to an operating port of the second on-off valve V2. The operating port of the second on-off valve V2 is supplied with pilot air from the operation air pipe 181. Thus, the operation air pipe 181 is configured to supply operation air for operating the second on-off valve V2. The second air pipe P2 is connected to a second electro-pneumatic regulator K2. The second electro-pneumatic regulator K2 is accommodated in the accommodation case 15a. The second electro-pneumatic regulator K2 is one of the pneumatic devices. The above-described three-port valve 13, the first electro-pneumatic regulator K1, and the second electro-pneumatic regulator K2 are used as the pneumatic devices that control the pressure supplied to the first air cylinder 91 and the second air cylinder 63.

The controller 15 calculates the balancing pressure based on the value detected by the load sensor 72. The second electro-pneumatic regulator K2 is constantly controlled to always supply a balancing pressure that acts on the second air cylinder 63 of the third arm 61. The balancing pressure balances the weight of a member connected to the protruding end of the piston rod 63d. When the three-port valve 13 supplies air to the operation air pipe 181 from the air supply source 14, and air is supplied from the operation air pipe 181 to the operating port of the second on-off valve V2, the second on-off valve V2 is put into the open state. The controller 15 controls the second electro-pneumatic regulator K2 such that the calculated balancing pressure is supplied to the piston chamber 65. This is also referred to as a controlled state of the balancing pressure. When the three-port valve 13 discharges air from the operation air pipe 181, the second on-off valve V2 is shut off, so that inflow and outflow of air are blocked.

When the second on-off valve V2 is controlled to the open state, the piston chamber 65 of the second air cylinder 63 is supplied with the balancing pressure, which is controlled by the second electro-pneumatic regulator K2. This achieves weight balance and thus creates a balanced state. Thus, the controller 15 constantly controls the balancing pressure supplied to the second air cylinder 63 based on the value detected by the load sensor 72.

When the second on-off valve V2 is controlled to the closed state, the outflow of air from the piston chamber 65 of the second air cylinder 63 is stopped, so that movement of the second air cylinder 63 is restricted.

At the same time as the arm-type assistance device 11, which has the above-described configuration, is turned on, the value detected by the load sensor 72 is delivered to the controller 15. The controller 15 calculates the balancing pressure for putting the second air cylinder 63 of the third arm 61 into a balanced state and starts controlling the pressure in the second air pipe P2 through the second electro-pneumatic regulator K2. In other words, the controller 15 is put into a constant control mode. When the arm-type assistance device 11 is turned on, the second on-off valve V2 is in the closed state.

When the operating unit 71 is in the operation state, the second on-off valve V2 is put into the open state, so that the balancing pressure is supplied to the piston chamber 65 of the second air cylinder 63. At this time, the second air cylinder 63 is simply put in a balanced state, but does not operate. If the operating unit 71 is manually operated upward or downward, the volume of the piston chamber 65 changes. However, the balanced state is maintained through control of the balancing pressure by the second electro-pneumatic regulator K2.

As shown in FIG. 6, a third rotational joint 17c, which has the same configuration as the first rotational joint 17a, is coupled to the protruding end of the piston rod 63d. A third lock mechanism 163, which has the same configuration as the first lock mechanism 161, is integrated with the lower end face of the third rotational joint 17c. The operating unit 71 is fixed to the lower end face of the third lock mechanism 163. The third rotational joint 17c is rotational in the horizontal direction. The operating unit 71 is integrated with a lower part of the third lock mechanism 163, which is integrated with the third rotational joint 17c. Thus, the operating unit 71 is configured to rotate in the horizontal direction. The rotation range of the operating unit 71 is less than 360 degrees, and is, for example, 300 degrees in the present embodiment.

Figure 7:
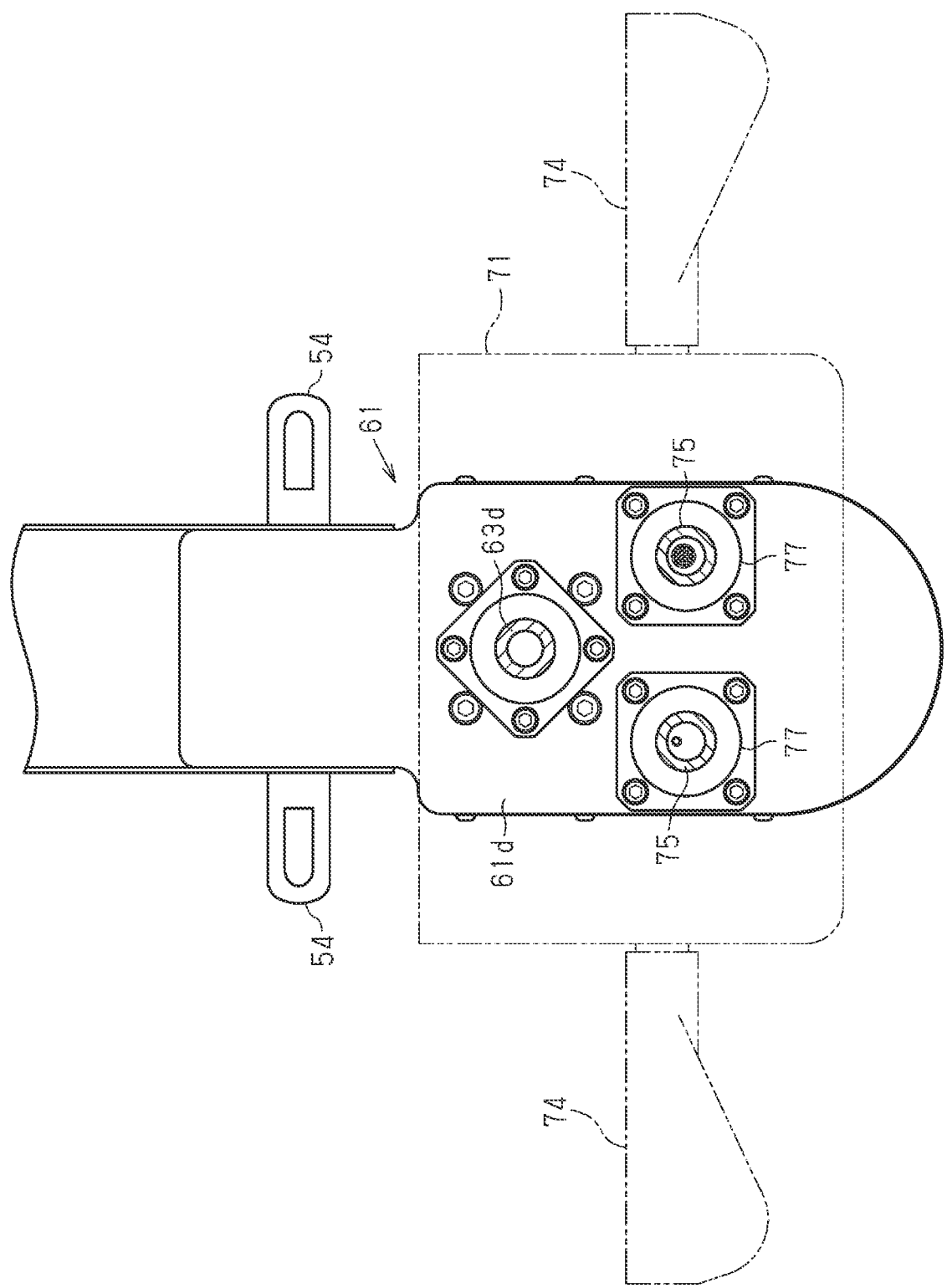
FIG. 7 is a cross-sectional view taken along line 7-7 of FIG. 6.

As shown in FIGS. 6 and 7, the lower ends of the two guide rods 75 are coupled to the operating unit 71 with a rod block 64, the third rotational joint 17c, and the third lock mechanism 163 in between. The guide rods 75 each have the shape of a cylinder or a pipe. The guide rods 75 guide vertical movement of the operating unit 71 when the piston 63b of the second air cylinder 63 moves vertically. The guide rods 75 extend through the closing wall 61d of the arm body 62. Two rolling-element bearings 77 are fixed to the lower surface of the closing wall 61d of the arm body 62. The guide rods 75 are respectively passed through the rolling-element bearings 77. The guide rods 75 are supported by the rolling-element bearings 77 so as to move smoothly in the vertical direction. The guide rods 75 have been quenched to have an increased hardness.

The upper ends of the guide rods 75 are located inside the arm body 62. The guide rods 75 are held by a plate-shaped holding member 76 and a mounting bracket 76a so as to be spaced apart from each other by a constant interval. An impact reducing member 66 is placed on an inner surface of the closing wall 61d of the arm body 62. The impact reducing member 66 is a shock absorber. The impact reducing member 66 contacts the holding member 76 when the holding member 76 moves down to an end of the movement range, thereby absorbing the shock generated when the holding member 76 reaches the end of the movement range.

The center of gravity of the operating unit 71 is located at the position of the center of gravity of a triangle formed by central axes of the respective guide rods 75 and the central axis of the piston rod 63d of the second air cylinder 63. The carried object held by the cargo holding unit 81 is supported by three rods, which are the two guide rods 75 and the piston rod 63d of the second air cylinder 63. Thus, the piston rod 63d of the second air cylinder 63 is also used as a guide rod that guides vertical movements of the operating unit 71. Accordingly, the stiffness of each section between the center of gravity of the three rod and each rod is increased, achieving a structure that withstands torque.

A first end of a cableveyor (registered trademark) 78 is fixed to the mounting bracket 76a. A second end of the cableveyor 78 is fixed to the inner surface of the curved wall 62c of the arm body 62.

As shown in FIG. 8, the load sensor 72 is connected to the controller 15 by a wire W4 so as to allow for transmission of signals. The detection switch 73 is connected to the controller 15 by a wire W5 so as to allow for transmission of signals. The detection switch 73 is turned on when detecting that the operating unit 71 is operated and outputs an ON signal to the controller 15. The operating unit 71 includes two operation handles 74. When an operator holds the operation handles 74, that is, when the operation handles 74 are in an operation state, the detection switch 73 detects that the operating unit 71 is operated, and is turned on. In the non-operation state, in which the operation handles 74 are not held by the operator, the detection switch 73 is off.

The wires W4, W5, which are connected to the controller 15, are routed into the pillar 12, the interior of the first rotational joint 17a, the interior of the first lock mechanism 161, the interior of the first support portion 21, the first arm 31, the interior of the second support portion 41, the interior of the second rotational joint 17b, the interior of the second lock mechanism 162, the second arm 51, and the third arm 61. The pillar 12, the first rotational joint 17a, the first lock mechanism 161, the first support portion 21, the first arm 31, the second support portion 41, the second rotational joint 17b, the second lock mechanism 162, the second arm 51, and the third arm 61 form a continuous hollow portion. The wires W4, W5 and the operation air pipe 181 are arranged in the hollow portion so as to be protected.

In the third arm 61, the wires W4, W5 and a third locking air pipe B3, which branches from the operation air pipe 181, are accommodated in the cableveyor 78 from the second end of the cableveyor 78 and are routed out from the first end of the cableveyor 78. Further, the wires W4, W5 are inserted into one of the guide rods 75, pass through the interior of the third rotational joint 17c and the interior of the third lock mechanism 163, and are respectively connected to the load sensor 72 and the detection switch 73. Also, the third locking air pipe B3 is inserted into the other guide rod 75, passes through the third rotational joint 17c, and is connected to the third lock mechanism 163.

When air is supplied to the third lock mechanism 163 from the air supply source 14 through the operation air pipe 181 and the third locking air pipe B3, the lock pad separates from the rotating lock disc, so that the third lock mechanism 163 is put into the unlocked state. When the supply of air from the air supply source 14 is stopped, the lock pad is urged toward the rotation locking disc by the urging member (not shown). Accordingly, the lock pad holds the rotating lock disc, so that the third lock mechanism 163 is put into the locked state. Therefore, the third lock mechanism 163 is controlled by the air supplied from the operation air pipe 181 through the third locking air pipe B3. When in the locked state, the third lock mechanism 163 restricts rotation of the operating unit 71.

Operation of the arm-type assistance device 11 will now be described.

FIG. 5A shows the arm-type assistance device 11 in the initial state. That is, FIG. 5A shows the non-operation state, in which the operator is not performing operation. In this state, the operation handles 74 are not held, and no carried object is held by the cargo holding unit 81. In this case, the detection switch 73 is off. The controller 15 de-energizes the three-port valve 13 so as to discharge the pressure in the operation air pipe 181. Also, the controller 15 controls the pressures of the first electro-pneumatic regulator K1 and the second electro-pneumatic regulator K2 in accordance with the value detected by the load sensor 72. The value detected by the load sensor 72 corresponds to the total weight of the components supported by the pillar 12.

The operation air of the first on-off valve V1 and the second on-off valve V2 is supplied from the operation air pipe 181. However, the pressure in the operation air pipe 181 has been discharged as described above. Accordingly, the first on-off valve V1 and the second on-off valve V2 are in the closed states, so that no air is supplied to or discharged from the piston chambers S, 65. In contrast, the first air pipe P1 and the second air pipe P2 are supplied with the balancing pressure respectively by the first electro-pneumatic regulator K1 and the second electro-pneumatic regulator K2. However, the balancing pressure is not supplied to the piston chambers S, 65.

Figure 9:
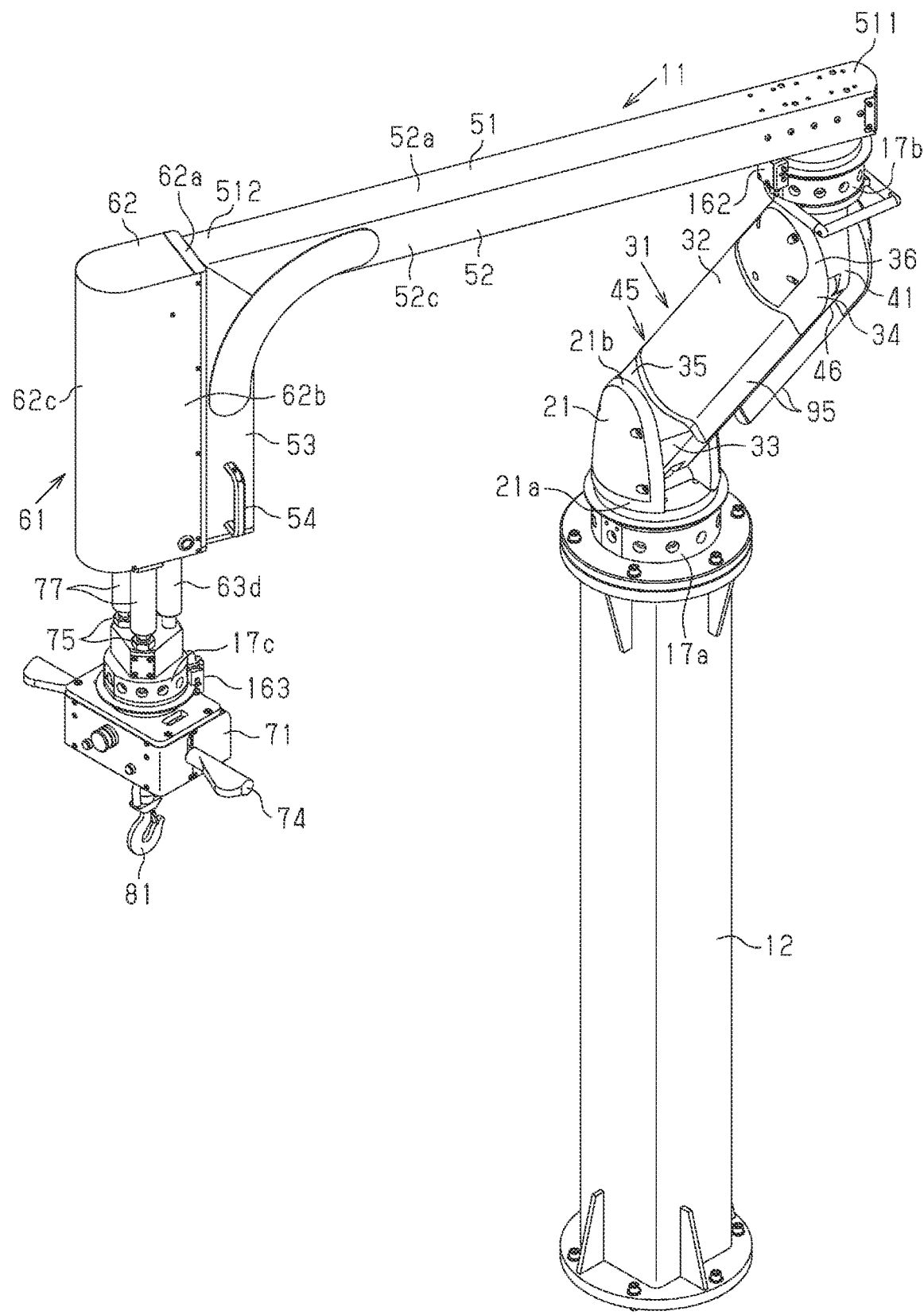
FIG. 9 is a perspective view of the arm-type assistance device shown in FIG. 1.
Figure 10:
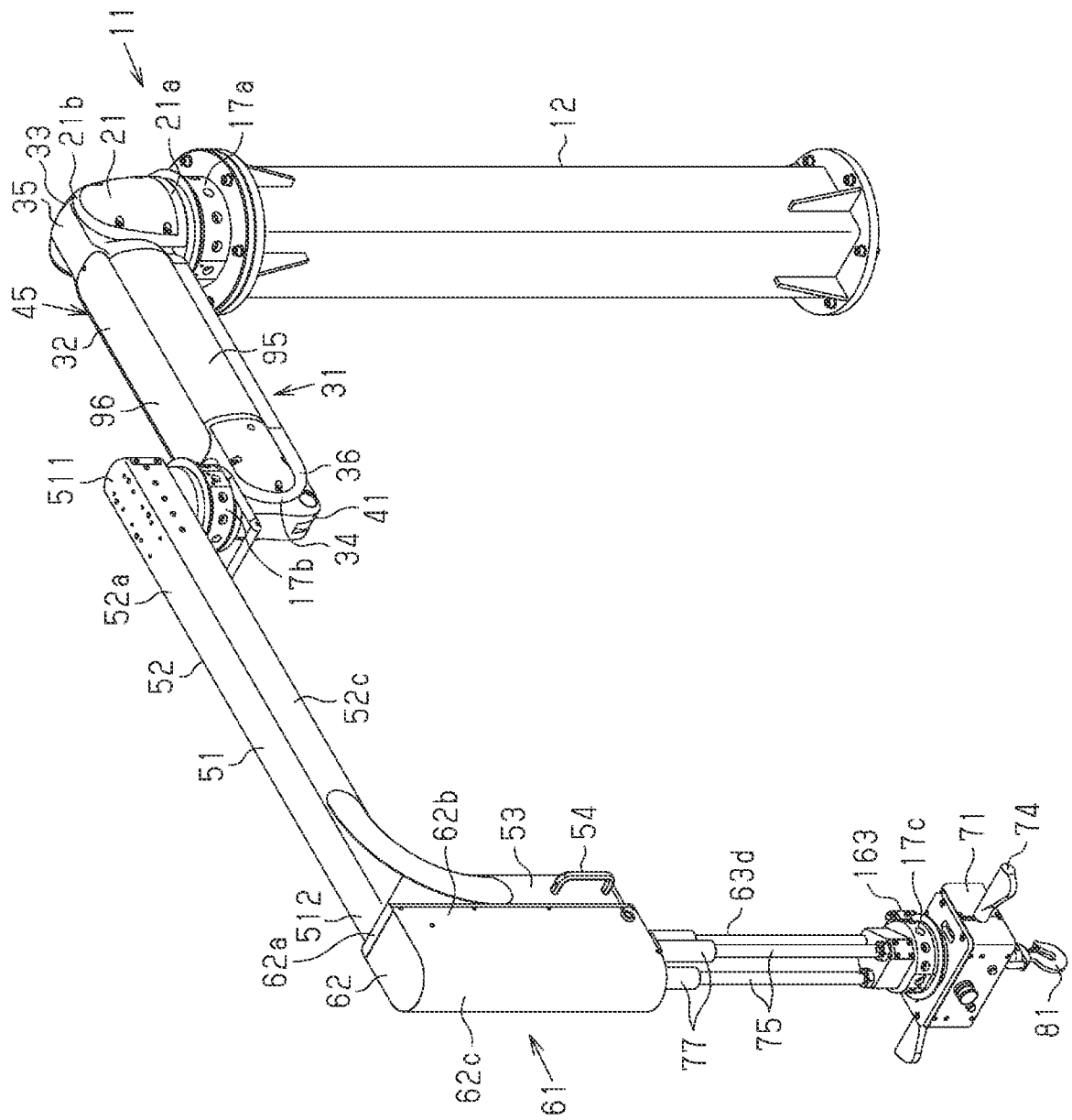
FIG. 10 is a perspective view of the arm-type assistance device shown in FIG. 1.

As shown in FIGS. 5B, 9, and 10, when the operator holds the operation handles 74, so that the operating unit 71 is in the operation state, the detection switch 73 is turned on, so that the controller 15 receives an ON signal from the detection switch 73. When receiving the ON signal from the detection switch 73, the controller 15 controls the three-port valve 13 such that operation air is supplied to the operation air pipe 181 from the air supply source 14. Then, the operating branch air pipe P and the operation air pipe 181 respectively supply pilot air to the first on-off valve V1 and the second on-off valve V2, so that the first on-off valve V1 and the second on-off valve V2 are opened. The piston chambers S, 65 are supplied with the balancing pressure respectively by the first air pipe P1 and the second air pipe P2, so that the first air cylinder 91 and the second air cylinder 63 are put into the balanced state. At the same time, the operation air is supplied to the first to third lock mechanisms 161 to 163 from the operation air pipe 181, so that the lock mechanisms 161 to 163 are switched from the locked state to the unlocked state. This allows the arm-type assistance device 11 to move vertically and rotate, so that the carried object can be moved.

When the carried object is held by the cargo holding unit 81, so that the carried object is slung from the arm-type assistance device 11, the piston 63b would normally move in accordance with the weight of the carried object. This reduces the volume of the piston chamber 65, so that the air pressure would normally increase. However, air is discharged from the piston chamber 65, so that the pressure in the piston chamber 65 is adjusted to a constant pressure that corresponds to the load detected by the load sensor 72, so that the slung state is maintained.

When the operating unit 71 is lowered in order to lower the carried object, the piston 63b is moved to reduce the volume of the piston chamber 65. Accordingly, the air pressure increases. However, air is discharged from the piston chamber 65, so that the pressure in the piston chamber 65 is adjusted to a constant pressure that corresponds to the load detected by the load sensor 72, so that the slung state is maintained.

When the operator further operates the operating unit 71, a change in the position in the vertical position of the operating unit 71 displaces the parallel linkage. As the parallel linkage is displaced, the piston 91b of the first air cylinder 91 is moved by the link member 93 and the actuation rod 92. The movement of the piston 91b changes the volume of the piston chamber S. Even if the volume of the piston chamber S changes, the first electro-pneumatic regulator K1 always controls the balancing pressure based on a signal of the load sensor 72.

Specifically, when the operating unit 71 is operated such that the second support portion 41 moves upward, the piston 91b moves so that the volume of the piston chamber S increases. Accordingly, the pressure of the air in the piston chamber S would normally decrease. However, air is supplied to the piston chamber S so that the pressure in the piston chamber S is controlled to a constant pressure that corresponds to the load detected by the load sensor 72. Thus, the weight balance is maintained even if the second support portion 41 is moved.

When the arm-type assistance device 11 is operated to lower the second support portion 41, the piston 91b moves to reduce the volume of the piston chamber S. Accordingly, the pressure of the air in the piston chamber S would normally increase. However, air is discharged from the piston chamber S so that the pressure in the piston chamber S is controlled to a constant pressure that corresponds to the load detected by the load sensor 72. Thus, the weight balance is maintained even if the second support portion 41 is moved.

Also, as shown in FIG. 9, when the first support portion 21 rotates on the pillar 12, the first arm 31 rotates. Accordingly, the operating unit 71 moves in the horizontal direction while rotating. Further, when the first support portion 21 and the second support portion 41 both rotate, and the first arm 31 and the second arm 51 both rotate as shown in FIG. 10, the rotation radius of the operating unit 71 changes.

The above-described embodiment has the following advantages.

(1) In the arm-type assistance device 11, the first arm 31 supports the second arm 51 with the second support portion 41 in between, and the third arm 61 is coupled to the second arm 51. The first arm 31 incorporates the first air cylinder 91, and the third arm 61 incorporates the second air cylinder 63. Thus, when a carried object is slung, the first air cylinder 91 and the second air cylinder 63 assist in achieving weight balance. This extends the movement range in the vertical direction of the cargo holding unit 81. The arm-type assistance device 11 includes two movement regions of the cargo holding unit 81 respectively corresponding to two actuators. This reduces the weight and the torque borne by the arm-type assistance device 11. Also, since the dimension in the axial direction of the second arm 51 is greater than the dimension in the axial direction of the first arm 31, the dimension in the axial direction of the first arm 31 is reduced. This extends the horizontal movement range of the cargo holding unit 81 while limiting reduction in the conversion efficiency of the parallel linkage. When compared with a case in which assistance is provided only by the first air cylinder 91, the diameter of the first air cylinder 91 can be reduced, so that sliding motion of the piston 91b in the first air cylinder 91 will not be hindered. Accordingly, it is possible to extend the movement range without reducing the operability of the arm-type assistance device 11.

(2) Since the third arm 61 is provided with the second air cylinder 63, the vertical position of the carried object can be finely adjusted through vertical movement of the piston rod 63d of the second air cylinder 63.

(3) The third arm 61 extends downward from the upper end face of the second arm 51. As the position at which the third arm 61 is attached to the second arm 51 is raised, the length of the third arm 61 in the vertical direction is extended in order to position the operating unit 71 and the cargo holding unit 81 at heights of the predetermined initial positions. Such extension of the third arm 61 is not preferable. However, since the third arm 61 extends from the upper end of the second arm 51, the length of the third arm 61 is not required to be increased to position the operating unit 71 and the cargo holding unit 81 at the predetermined heights.

(4) The cylinder tube 91a of the first air cylinder 91 is one of the components of the parallel linkage, and the actuation rod 92 of the first air cylinder 91 and the first end portion of the second member 46 are coupled to each other by the link member 93. Since the cylinder tube 91a of the first air cylinder 91 is used as a component of the parallel linkage, the stiffness of the parallel linkage is increased. This configuration also reduces the weight of the parallel linkage and simplifies the structure.

(5) The two guide rods 75 and the piston rod 63d of the second air cylinder 63 are coupled to the operating unit 71. As such, the operating unit 71 is supported by three rods at three points. Thus, even if the center of gravity of the carried object is displaced from the center of gravity of the cargo holding unit 81, the eccentricity reduces the load acting on the guide rods 75 and the piston rod 63d by distributing the moment to three locations.

(6) One of the three guide rods that guide the vertical movement of the operating unit 71 relative to the third arm 61 is the piston rod 63d of the second air cylinder 63. For example, as compared to a case in which a guide rod is provided separately from the second air cylinder 63, the structure for supporting the operating unit 71 and the cargo holding unit 81 is simplified, and the weight of the third arm 61 is reduced.

(7) In the non-operation state, in which the cargo holding unit 81 is not holding a carried object, and the operation handles 74 are not being operated, the first to third lock mechanisms 161 to 163 are in the locked state. Also, in the non-operation state of the operating unit 71, the balancing pressure is controlled constantly. However, inflow of air to and outflow of air from the piston chambers S, 65 are blocked by the first on-off valve V1 and the second on-off valve V2. That is, unnecessary operations of the arm-type assistance device 11 are restricted. When the cargo holding unit 81 holds a carried object, the value detected by the load sensor 72 changes, and the balancing pressure is calculated in accordance with the detected value. Accordingly, a pressure control value is changed. When the operation handles 74 are operated, the controller 15 switches the first to third lock mechanisms 161 to 163 to the unlocked state, and the first on-off valve V1 and the second on-off valve V2 are opened, so that the balancing pressure is introduced to the piston chambers S, 65. Therefore, a balanced state in accordance with the carried object is achieved quickly.

(8) In the arm-type assistance device 11, the pillar 12, the first rotational joint 17a, the first lock mechanism 161, the first support portion 21, the first arm 31, the second support portion 41, the second rotational joint 17b, the second lock mechanism 162, the second arm 51, and the third arm 61 form a continuous hollow portion. The hollow portion incorporates the operation air pipe 181, the first to third locking air pipes B1 to B3, and the wires W4, W5. The hollow portion thus protects the various pipes and wires, while preventing the appearance of the arm-type assistance device 11 from being spoiled.

(9) The third arm 61 incorporates the impact reducing members 66, 67. The impact reducing member 66 reduces the impact generated when the two guide rods 75 are lowered and reach the end of the movement range. The impact reducing member 67 reduces the impact generated when the piston 63b of the second air cylinder 63 is raised and reaches the end of the movement range. The second air cylinder 63 has a smaller diameter than the first air cylinder 91, and the seal member of the piston 63b also has a small diameter. This reduces the sliding resistance of the seal member. Accordingly, when the carried object is moved in the vertical direction, the piston 63b of the second air cylinder 63 is likely to move and reach the end of the movement range earlier than the piston 91b of the first air cylinder 91. However, the impact reducing members 66, 67 provided at the ends of the movement ranges reduce the impact generated when the second air cylinder 63 reaches the ends of the movement ranges.

(10) The rotation range of the first arm 31 by the first support portion 21 is less than 360 degrees, and the rotation range of the second arm 51 by the second support portion 41 is less than 360 degrees. The rotation range of the operating unit 71 is less than 360 degrees. Thus, even if the first support portion 21 and the second support portion 41 rotate as the first arm 31 and the second arm 51 rotate, the operation air pipe 181 and the wires W4, W5 are unlikely to be twisted. Likewise, even if the operating unit 71 rotates, the operation air pipe 181 and the wires W4, W5 are unlikely be twisted.

(11) The second arm 51 is supported at a position above the first arm 31. Thus, although the dimension in the axial direction of the second arm 51 is greater than the dimension in the axial direction of the first arm 31, the second arm 51, which extends from the distal end of the first arm 31, is unlikely to hinder the operation of the operator.

(12) The dimension in the axial direction of the second arm 51 is greater than the dimension in the axial direction of the first arm 31, and the third arm 61 is coupled to the distal end of the second arm 51. Thus, even though the second arm 51 is supported at a position above the first arm 31 with the second support portion 41 in between, and the third arm 61 is coupled to the second arm 51, the first arm 31 and the second arm 51 can be stacked in the vertical direction without causing the third arm 61 to interfere with the first arm 31. Thus, the size of the arm-type assistance device 11 is reduced.

The present embodiment may be modified as follows. The present embodiment and the following modifications can be combined as long as the combined modifications remain technically consistent with each other.

The rotation range of the first arm 31 by the first support portion 21 may be greater than 360 degrees, and the rotation range of the second arm 51 by the second support portion 41 may be greater than 360 degrees. The rotation range of the operating unit 71 may be greater than 360 degrees.

The second air cylinder 63 may be provided with an impact reducing member that reduces an impact generated when the operating unit 71 is lowered and reaches the end of the movement range. Also, the guide rods 75 may be provided with an impact reducing member that reduces the impact generated when the operating unit 71 is raised and reaches the end of the movement range. The second air cylinder 63 or the guide rods 75 may be provided with an impact reducing member that reduces the impact generated when the operating unit 71 is raised or lowered and reaches the end of the movement range.

The impact reducing members 66, 67 may be omitted.

The operation air pipe 181, the operating branch air pipe P, the first air pipe P1, the second air pipe P2, and the wires W4, W5 may be entirely or partially exposed to the outside of the hollow portion of the arm-type assistance device 11.

The two guide rods 75 and the piston rod 63d of the second air cylinder 63 do not necessarily need to be arranged to form a triangular shape. For example, the piston rod 63d and the guide rods 75 may be arranged in line such that the guide rods 75 are located on opposite sides of the piston rod 63d.

The guide rods 75 may be omitted.

The number of the guide rods 75 may be one or greater than two.

The upper end of the third arm 61 may be located above or below the upper surface of the upper wall 52a of the first hollow body 52 in the second arm 51.

The first member of the parallel linkage does not necessarily need to include the first air cylinder 91.

The controller 15 may be processing circuitry including: 1) one or more processors that operate according to a computer program (software); 2) one or more dedicated hardware circuits (application specific integrated circuits: ASICs) that execute at least part of various processes, or 3) a combination thereof. The processor includes a central processing unit (CPU) and memories such as a random-access memory (RAM) and a read-only memory (ROM). The memories store program codes or commands configured to cause the CPU to execute processes. The memory, which is a computer-readable medium, includes any type of media that are accessible by general-purpose computers and dedicated computers.

The invention claimed is:

1. An arm-type assistance device, comprising:
a pillar that includes an axis extending in a vertical direction;
a first support portion that is supported by an upper end of the pillar so as to be rotatable in a horizontal direction;
a first arm that includes a proximal end portion, the proximal end portion being supported by the first support portion so as to be swingable in the vertical direction;
a second support portion that is supported by a distal end portion of the first arm so as to be swingable in the vertical direction;
a second arm that includes a proximal end portion, the proximal end portion being supported by an upper end of the second support portion so as to be rotatable in the horizontal direction;

a third arm that extends downward in the vertical direction from a distal end portion of the second arm;
an operating unit that is supported by a lower end of the third arm so as to be rotatable in the horizontal direction; and
a cargo holding unit that is integrated with the operating unit, wherein
the first arm includes:
a first member that includes a first end portion and a second end portion, the first end portion being supported by the first support portion so as to be swingable in the vertical direction, and the second end portion being supported by the second support portion so as to be swingable in the vertical direction;
a first air cylinder that is configured to swing the first member relative to the first support portion; and
a second member that extends parallel with the first member and includes a first end portion and a second end portion, the first end portion being supported by the first support portion so as to be swingable in the vertical direction, and the second end portion being supported by the second support portion so as to be swingable in the vertical direction,
the first support portion, the first member, the second support portion, and the second member form a parallel linkage, the parallel linkage being assisted by operation of the first air cylinder,
the arm-type assistance device further comprises a controller that is configured to control pressure of the first air cylinder,
the third arm includes a second air cylinder, a pressure of the second air cylinder being controlled by the controller,
the second air cylinder includes a piston rod that includes a protruding end, the protruding end supporting the operating unit, and
a dimension in an axial direction of the second arm is greater than a dimension in an axial direction of the first arm.

2. The arm-type assistance device according to claim 1, wherein the third arm extends from an upper end of the second arm toward a lower end of the second arm.

3. The arm-type assistance device according to claim 1, wherein a cylinder tube of the first air cylinder is the first member.

4. The arm-type assistance device according to claim 1, wherein the operating unit is coupled to three or more guide rods, the guide rods guiding vertical movement of the operating unit as the piston rod of the second air cylinder moves vertically.

5. The arm-type assistance device according to claim 4, wherein one of the three or more guide rods is the piston rod of the second air cylinder.

6. The arm-type assistance device according to claim 1, further comprising:
a load sensor configured to detect a load of a carried object, the load sensor being connected to the controller so as to allow for transmission of signals;
a lock mechanism configured to restrict rotation of the first support portion, the second support portion, and the operating unit; and
a pneumatic device configured to control pressure applied to the first air cylinder and the second air cylinder, wherein
the controller is configured to switch the lock mechanism between a locked state and an unlocked state,
in a non-operation state of the operating unit, the controller controls the lock mechanism to the locked state, constantly controls pressure supplied to the first air cylinder and pressure supplied to the second air cylinder based on a value detected by the load sensor, and stops supply of air to the first air cylinder and supply of air to the second air cylinder, and
when operation of the operating unit is detected, the controller switches the lock mechanism to the unlocked state, calculates the pressure supplied to the first air cylinder and the pressure supplied to the second air cylinder based on the value detected by the load sensor, and supplies the calculated pressures to the first air cylinder and the second air cylinder.

7. The arm-type assistance device according to claim 6, wherein
the operating unit is provided with the load sensor, and the pillar is provided with the controller and an air supply source,
the pillar, the first support portion, the first arm, the second support portion, the second arm, and the third arm include a continuous hollow portion, and
the arm-type assistance device further comprises:
a pipe that is arranged in the hollow portion and supplies air from the air supply source to the first air cylinder and the second air cylinder;
a pipe that is arranged in the hollow portion and supplies air from the air supply source to the lock mechanism; and
a wire that is arranged in the hollow portion and connects the load sensor to the controller.

8. The arm-type assistance device according to claim 1, further comprising an impact reducing member that reduces an impact generated when the piston of the second air cylinder reaches an end of a movement range.

9. The arm-type assistance device according to claim 1, rotation ranges of the first arm, the second arm, and the operating unit are each less than 360 degrees.

* * * * *